United States Patent
Tokai et al.

(10) Patent No.: US 8,040,388 B2
(45) Date of Patent: Oct. 18, 2011

(54) INDICATOR METHOD, SYSTEM, AND PROGRAM FOR RESTORING ANNOTATED IMAGES

(75) Inventors: Kiwame Tokai, Kanagawa (JP); Meng Shi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 380 days.

(21) Appl. No.: 12/249,674

(22) Filed: Oct. 10, 2008

(65) Prior Publication Data

US 2009/0195674 A1 Aug. 6, 2009

(30) Foreign Application Priority Data

Feb. 5, 2008 (JP) ................................. 2008-025398

(51) Int. Cl.
*H04N 5/228* (2006.01)

(52) U.S. Cl. ............. 348/222.1; 348/333.1; 348/240.99; 348/335

(58) Field of Classification Search ............. 348/240.99, 348/355, 222.1, 333.1
See application file for complete search history.

(56) References Cited

U.S. PATENT DOCUMENTS

| | | | | |
|---|---|---|---|---|
| 6,597,410 B1 * | 7/2003 | Doany et al. | ................... | 348/744 |
| 6,977,676 B1 * | 12/2005 | Sato et al. | ................ | 348/211.11 |
| 2002/0152557 A1 * | 10/2002 | Elberbaum | ....................... | 8/405 |
| 2002/0180726 A1 * | 12/2002 | Shi et al. | ....................... | 345/418 |
| 2003/0081266 A1 * | 5/2003 | Seaman et al. | ................ | 358/474 |
| 2004/0070674 A1 * | 4/2004 | Foote et al. | ............... | 348/207.99 |
| 2006/0290786 A1 * | 12/2006 | Tokai | ....................... | 348/211.99 |
| 2007/0177013 A1 * | 8/2007 | Shingu | ......................... | 348/143 |

FOREIGN PATENT DOCUMENTS

| | | |
|---|---|---|
| JP | 09-101937 A | 4/1997 |
| JP | 2005-033756 A | 2/2005 |

* cited by examiner

*Primary Examiner* — Jason Chan
*Assistant Examiner* — Usman Khan
(74) *Attorney, Agent, or Firm* — Sughrue Mion, PLLC

(57) ABSTRACT

An indicator system includes: a controller that transmits an image captured by an image capturing unit and a zoomed image captured by a zoom image capturing unit to a terminal, the image capturing unit capturing an image of an object, the zoom image capturing unit zooming in the object and capturing an image of the zoomed-in object, the controller causing a projecting unit to project an annotation image onto the object, the annotation image indicating an annotation in accordance with an instruction based on the image and given in the terminal; and a storing unit that stores conditions for capturing the zoomed image and the instruction which is associated with the conditions, when the instruction with respect to the annotation image is issued for the zoomed image.

9 Claims, 19 Drawing Sheets

INDICATOR METHOD, SYSTEM, AND PROGRAM FOR RESTORING ANNOTATED IMAGES

CROSS-REFERENCE TO RELATED APPLICATION

This application is based on and claims priority under 35 USC 119 from Japanese Patent Application No. 2008-025398 filed Feb. 5, 2008.

BACKGROUND

1. Technical Field

The present invention relates to an indicator system, a computer readable medium, and an indicating device.

2. Related Art

In a conference system or the like, it is necessary to issue instructions with respect to the operation procedures from a terminal side to an object side.

SUMMARY

According to an aspect of the invention, there is provided an indicator including: a controller that transmits an image captured by an image capturing unit and a zoomed image captured by a zoom image capturing unit to a terminal, the image capturing unit capturing an image of an object, the zoom image capturing unit zooming in the object and capturing an image of the zoomed-in object, the controller causing a projecting unit to project an annotation image onto the object, the annotation image indicating an annotation in accordance with an instruction based on the image and given in the terminal; and a storing unit that stores conditions for capturing the zoomed image and the instruction which is associated with the conditions, when the instruction with respect to the annotation image is issued for the zoomed image.

BRIEF DESCRIPTION OF THE DRAWINGS

Exemplary embodiments of the present invention will be described in detail based on the following figures, wherein.

DETAILED DESCRIPTION

The following is a description of exemplary embodiments of the present invention, with reference to the accompanying drawings.

First Exemplary Embodiment

Figure 1:
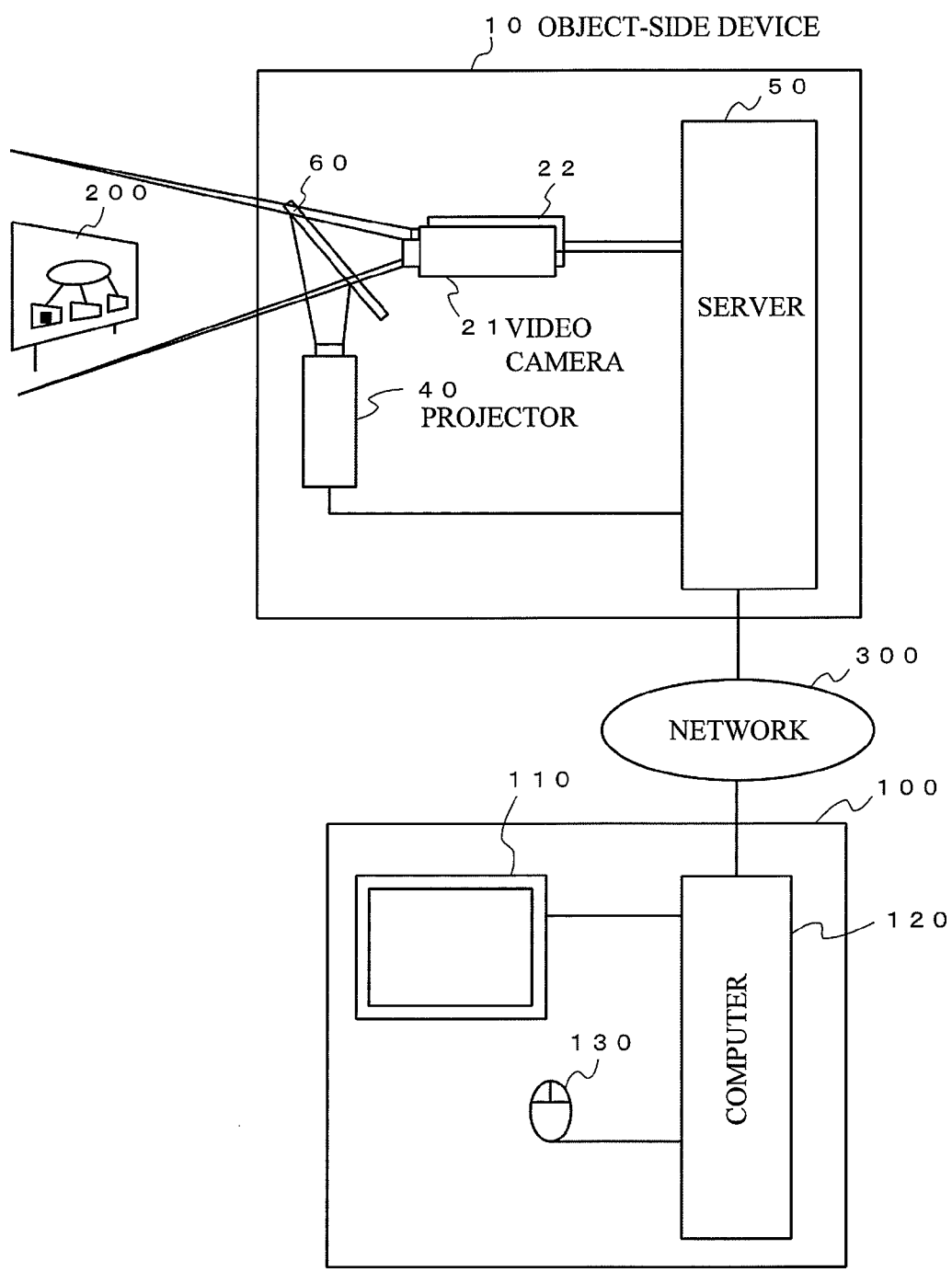
FIG. 1 illustrates the structure of an exemplary embodiment of an indicator system.
Figure 2:
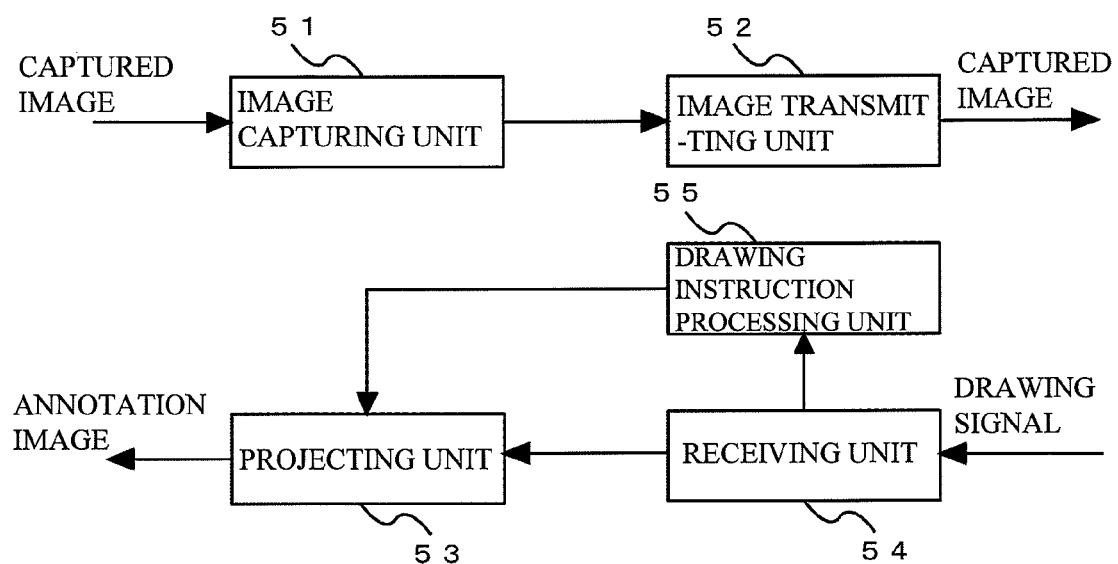
FIG. 2 is a functional block diagram illustrating the structure of the server shown in FIG. 1.
Figure 3:
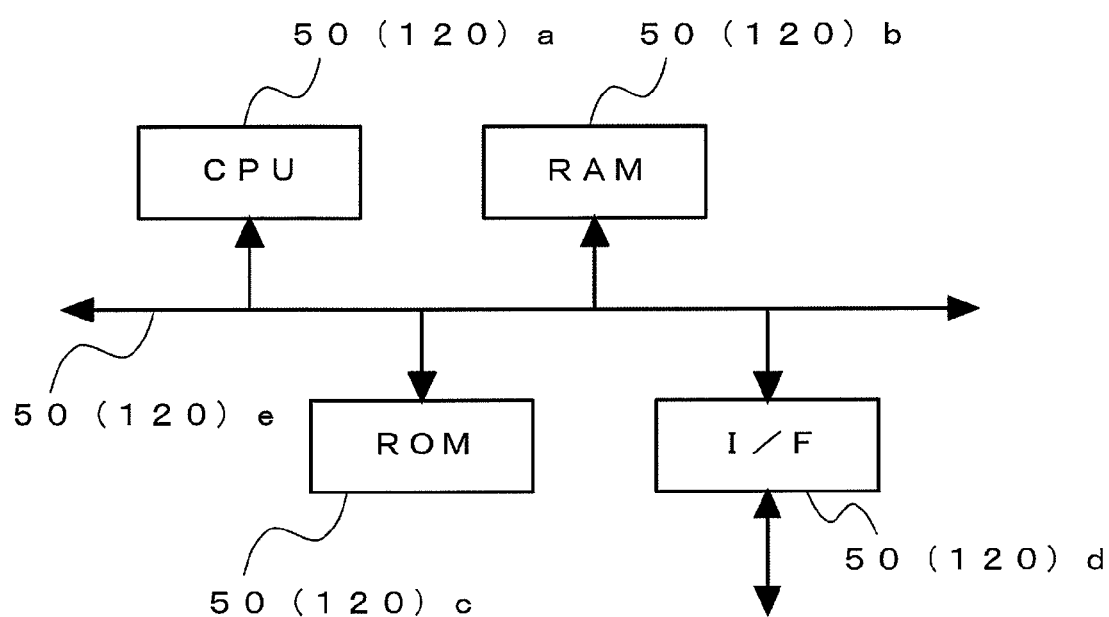
FIG. 3 is a functional block diagram illustrating the hardware structure of the server shown in FIG. 1.

FIG. 1 illustrates the structure of an indicator system in accordance with an exemplary embodiment of the present invention. FIG. 2 is a functional block diagram showing the components of the server. FIG. 3 is a functional block diagram illustrating the hardware structure of the server.

As shown in FIG. 1, this indicator system includes an object-side device 10 and a terminal 100. The object-side device 10 and the terminal 100 are connected by a network 300, so that communications can be made between the object-side device 10 and the terminal 100. Although only one terminal 100 is shown in FIG. 1, terminals 100 and 101 may be connected to a server 50 (described later) of the object-side device 10 through the network 300. Alternatively, the indicator system in accordance with this exemplary embodiment may be formed with one device covered with a housing or the like, or may be formed with several devices.

The object-side device 10 includes a video camera 21 as an image capturing unit, a video camera 22 as a zoom image-capturing unit, a projector 40 as a projecting unit, a server 50 as a controller, and a half mirror 60.

The video cameras 21 and 22 may be formed with CCD cameras, for example. The video camera 21 captures an image of an object 200 such as a whiteboard having a figure drawn thereon, and the information about the captured image is read in by the server 50. The video camera 22 zooms in the object 200 and captures the image of the object, and the information about the zoomed image is read in by the server 50. The video cameras 21 and 22 capture images transmitted through the half mirror 60.

The projector 40 may be formed with a liquid crystal projector, for example. The projector 40 projects an annotation image onto the object 200, in accordance with an instruction issued from the terminal 100 based on a captured image or a captured zoomed image. The optical system of the projector 40 is designed to have substantially the same optic principal point as the video cameras 21 and 22 by virtue of the half mirror 60. The projector 40 projects an annotation image transmitted from the server 50 onto the object 200 through the optical system and the half mirror 60. The annotation image from the projector 40 is reflected by the half mirror 60, and is then projected onto the object 200. The annotation image may be an image of any type, such as a line, a character, a figure. The reflectance of the half mirror 60 should preferably be in the neighborhood of 0.3%.

The server 50 controls operations of the video cameras 21 and 22, and the projector 40. The server 50 also exchanges various kinds of information with the terminal 100 through the network 300.

More specifically, the server 50 includes an image capturing unit 51 that controls the video cameras 21 and 22, and an image transmitting unit 52 that transmits an image or a zoomed image captured by the video cameras 21 and 22 to the terminal 100, as shown in FIG. 2. The server 50 also includes a receiving unit 53 that receives an instruction such as a figure drawing instruction from the terminal 100, and a projecting unit 54 that controls the projector 40 so as to project an annotation image. The server 50 further includes a drawing instruction processing unit 55 that performs necessary processing in accordance with a figure drawing instruction from the terminal 100.

With this arrangement, the server 50 transmits an image captured by the video camera 21 or 22 to the terminal 100, and causes the projector 40 to project an annotation image onto the object 200 in accordance with an instruction issued from the terminal 100 based on the captured image.

The terminal 100 includes a display device 110 that is a liquid crystal display or a CRT display or the like, a computer 120 that is connected to the network 300, and a pointing device (a mouse) 130 that is connected to the computer 120. The terminal 100 may be a notebook computer or a desktop computer, for example.

The display device 110 displays an image transmitted from the object-side device 10 on its display screen.

The pointing device 130 is used for forming an instruction with respect to an annotation image to be projected onto the object 200 by operating various buttons with the use of a pointer on the display screen displaying a captured image or the like.

Each of the server 50 and the computer 120 is a computer that is realized by a hardware structure in which a processing device 50a (120a) such as a CPU, a RAM 50b (120b) such as a SRAM (Static Random Access Memory), a DRAM (Dynamic RAM), a SDRAM (Synchronous DRAM), or a NVRAM (Non-Volatile RAM), a ROM (Read Only Memory) 50c (120c) such as a flash memory, and an interface 50d (120d) for controlling inputs and outputs are connected to one another with a bus 50e (120e), as shown in FIG. 3.

The CPU 50a (120a) reads a program stored in a memory device such as the RAM 50b (120b) or the ROM 50c (120c), and performs processing in accordance with the program, so as to realize the functions of the respective devices. The program may be designed in accordance with the flowchart described in the following. If necessary, a hard disk may be connected to the bus 50e (120e).

Figure 4:
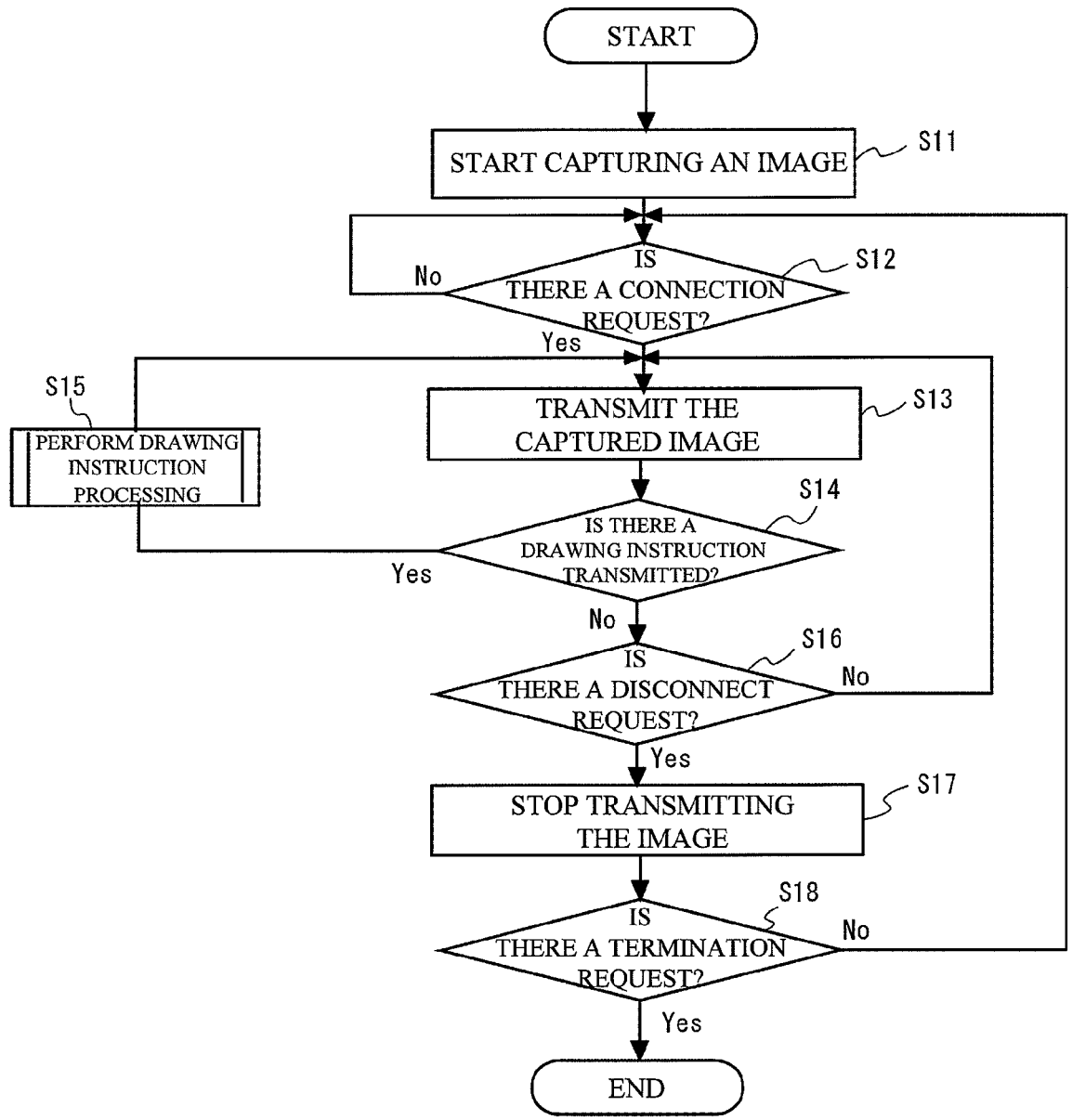
FIG. 4 is a flowchart showing an example of an operation to be performed by the server of the object-side device.
Figure 5:
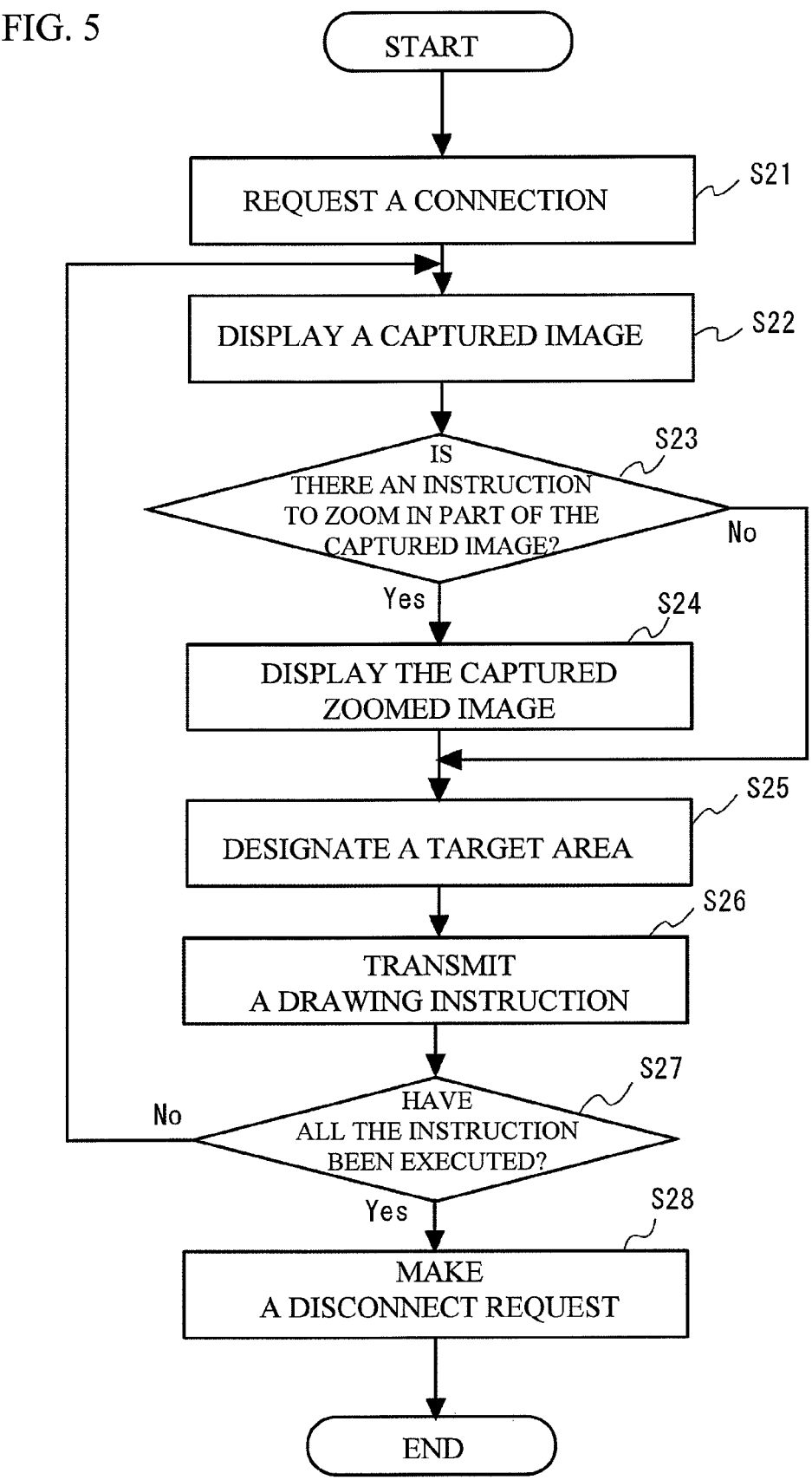
FIG. 5 is a flowchart showing an example of an operation to form an image to be performed in the computer of the terminal shown in FIG. 1.
Figure 6:
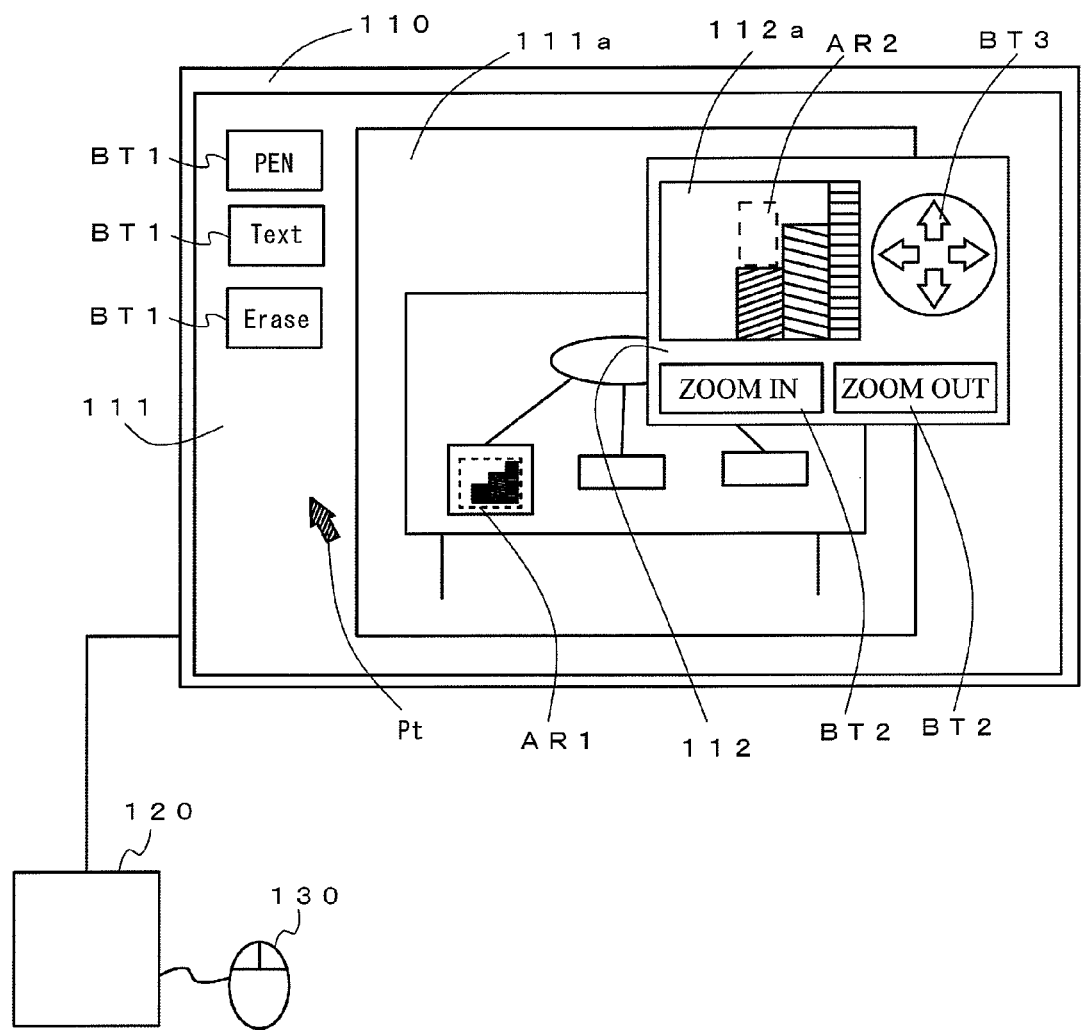
FIG. 6 is a schematic view for explaining an example of an operation to be performed on the terminal side.

Referring now to FIGS. 4 through 6, operations to be performed by the indicator system having the above described structure are described.

FIG. 4 is a flowchart showing an operation to be performed by the server 50 of the object-side device 10. FIG. 5 is a flowchart showing an image forming operation to be performed by the computer 120 of the terminal 100. FIG. 6 illustrates an operation to be performed in the terminal 100.

First, the operation to be performed by the server 50 is described.

As shown in FIG. 4, the server 50 of the object-side device 10 starts reading an image or a zoomed image captured by the video camera 21 or 22 (step S11), and determines whether there is a connection request from the computer 120 of the terminal 100 (step S12). If there is a connection request from the computer 120, the server 50 transmits the image captured by the video camera 21 or 22 to the computer 120 of the terminal 100 through the network 300 (step S13).

The server 50 next determines whether there is a drawing instruction transmitted from the computer 120 (step S14). This drawing instruction serves as the information about drawing an annotation image. If there is such a drawing instruction, the server 50 performs a drawing procedure in accordance with the contents of the drawing instruction (step S15).

If there is not a drawing instruction, the server 50 determines whether there is a disconnect request from the computer 120 (step S16). If there is not a disconnect request, the server 50 returns to step S13, and transmits a new captured image to the computer 120 of the terminal 100 through the network 300. If there is a disconnect request, the server 50 stops transmitting the image captured by the video camera 21 or 22 (step S17). The server 50 then determines whether there is a termination request (step S18). If there is not a termination request, the server 50 returns to step S12, and repeats the above procedures. If there is a termination request, the server 50 ends the operation.

Next, an operation to be performed in the terminal 100 is described. As shown in FIG. 5, the computer 120 of the terminal 100 first sends a connection request to the server 50 (step S21). After a connection is established, the computer 120 displays a captured image 111a transmitted from the server 50 on the object side, on the display screen 111 of the display device 110, as shown in FIG. 6 (step S22).

The computer 120 then determines whether there is an instruction to zoom in a part of the captured image (step S23). If there is a zoom-in instruction, the computer 120 activates a zoom display screen 112 in accordance with the instruction (step S24).

More specifically, the operator of the terminal 100 looks at the captured image 111a displayed on the display screen 111 shown in FIG. 6, and determines whether the captured image 111a includes an area AR1 to be zoomed in. If there is an area AR1 to be zoomed in, the operator handles the pointing device 130 to move a pointer Pt on the display screen 111 and point out the area AR1 to be zoomed in as an area to be captured. The zoom display screen 112 is then activated to zoom in and display the area AR1.

The zoom display screen 112 displays a zoomed image 112a captured by the video camera 22, as shown in FIG. 6. The zoom display screen 112 also includes buttons BT2 to "zoom in" and "zoom out", and cursor buttons BT3. The buttons BT2 are pressed to change the magnification ratio of the zoomed image, and the buttons BT3 are pressed to move the zoomed-in area AR1. Accordingly, the operator of the terminal 100 uses those buttons to designate a position onto which an annotation image is to be projected.

The computer 120 then determines whether there is an instruction with respect to a target area AR2 for the captured zoomed image 112a displayed on the zoom display screen 112 from the operator (step S23). If there is an instruction about the target area AR2, the computer 120 carries out a procedure in accordance with the instruction (step S26).

More specifically, the operator of the terminal 100 looks at the captured zoomed image 112a on the zoom display screen 112 shown in FIG. 6. If the captured zoomed image 112a on display includes an area AR2 onto which the operator wishes to project an annotation image, the operator handles the pointing device 130 to move the pointer Pt on the display screen 111 and point out the target area AR2. The target area AR2 defines the projection position onto which an annotation image is to be projected. At the same time, the operator designates the information about an annotation image AN to be projected onto the target area AR2.

For example, the information may include figure information about a rectangle or a circle drawn by operating the various buttons BT on the display screen 111 with the use of the pointing device 130, a predetermined bitmap image, text information input through the keyboard or the like, and the pointer reflecting the movement of the pointing device 130. The computer 120 then transmits the various kinds of information designated in step S26 as a drawing instruction to the server 50 (step S27).

The computer 120 then determines whether the instructing operation by the operator based on the zoomed image 112a captured by the video camera 22 has been completed in the terminal 100 (step S28). In a case where the instructing operation has been completed, the computer 120 sends a disconnect request to the server 50 (step S28), and ends the operation. In a case where the instructing operation by the operator of the terminal 100 has not been completed, the operation returns to step S22, and the above described procedures are repeated. In this operation, the area AR1 to be zoomed in may not be defined, and a drawing instruction with respect to the captured image 111a may be directly issued.

Figure 7:
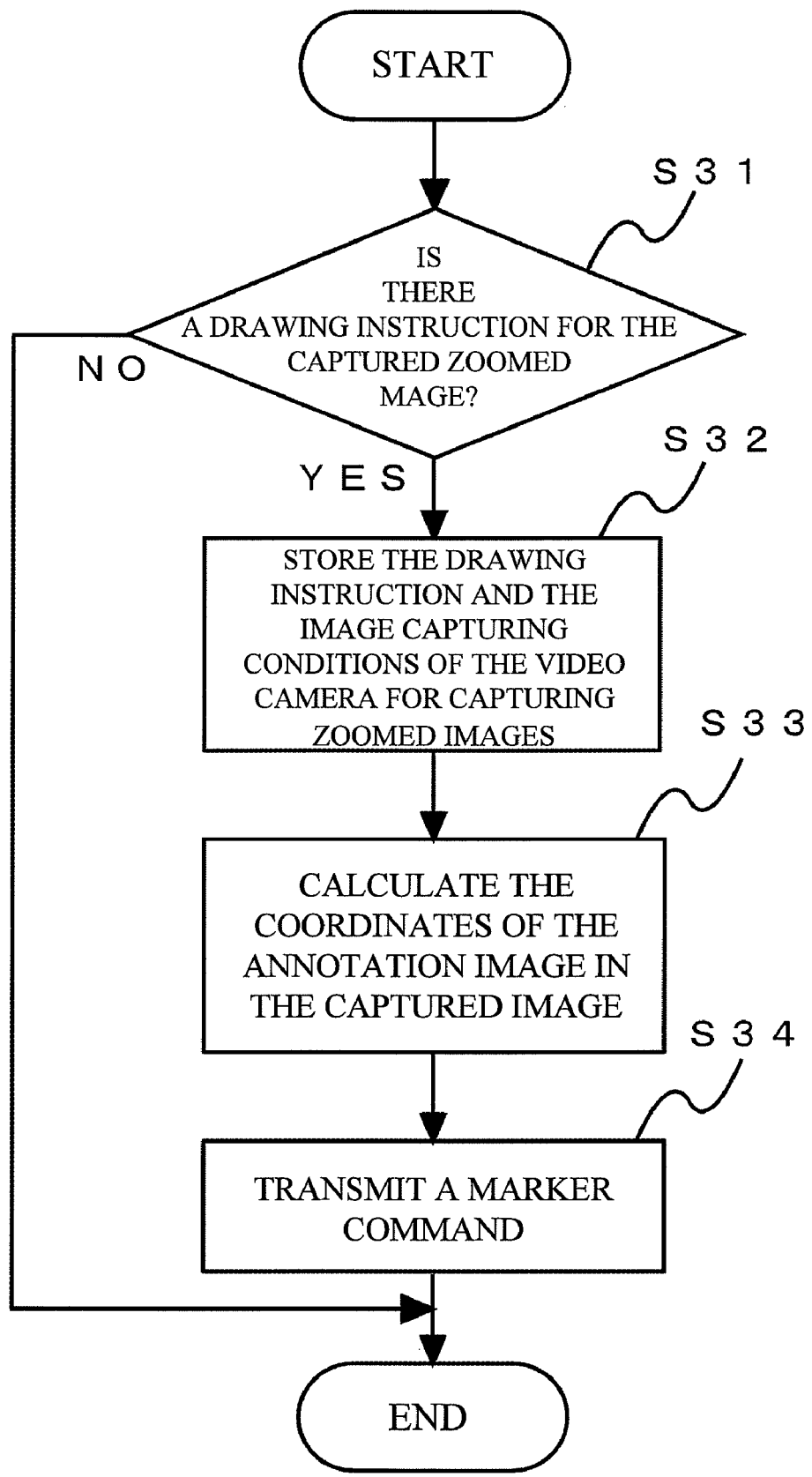
FIG. 7 is a flowchart showing an example of an operation to store an annotation image for a captured zoomed image.
Figure 8:
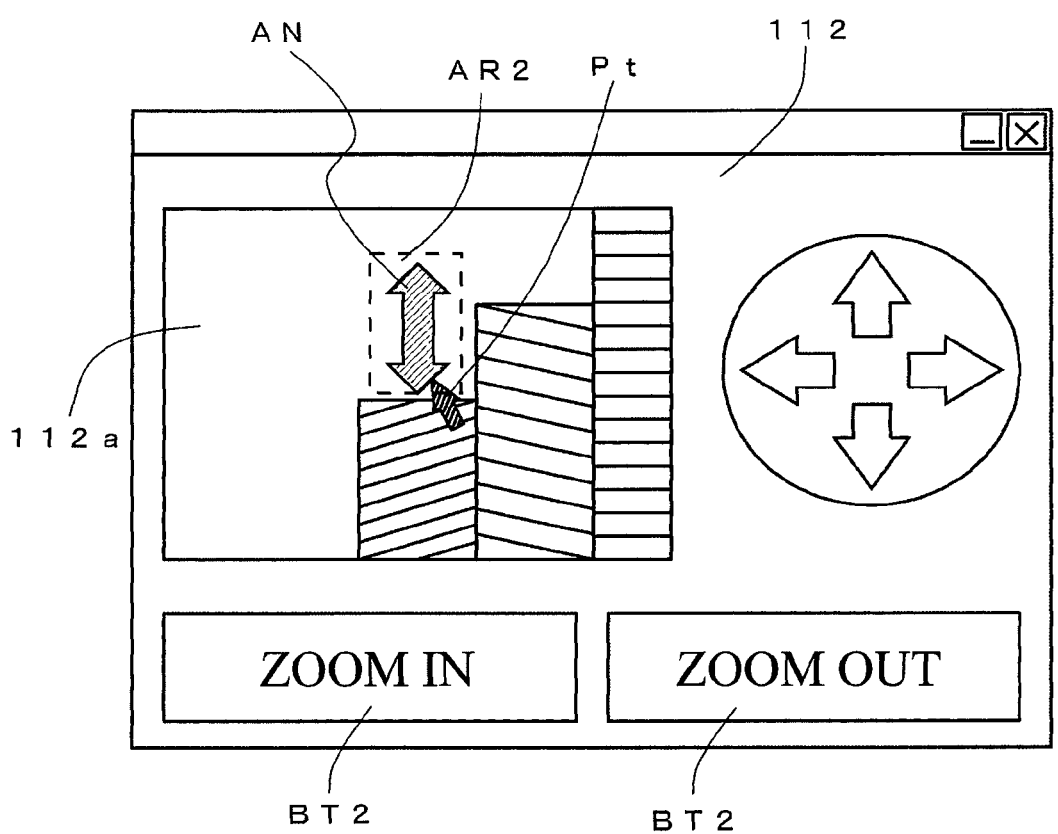
FIG. 8 shows an example of a zoom display screen.
Figure 9:
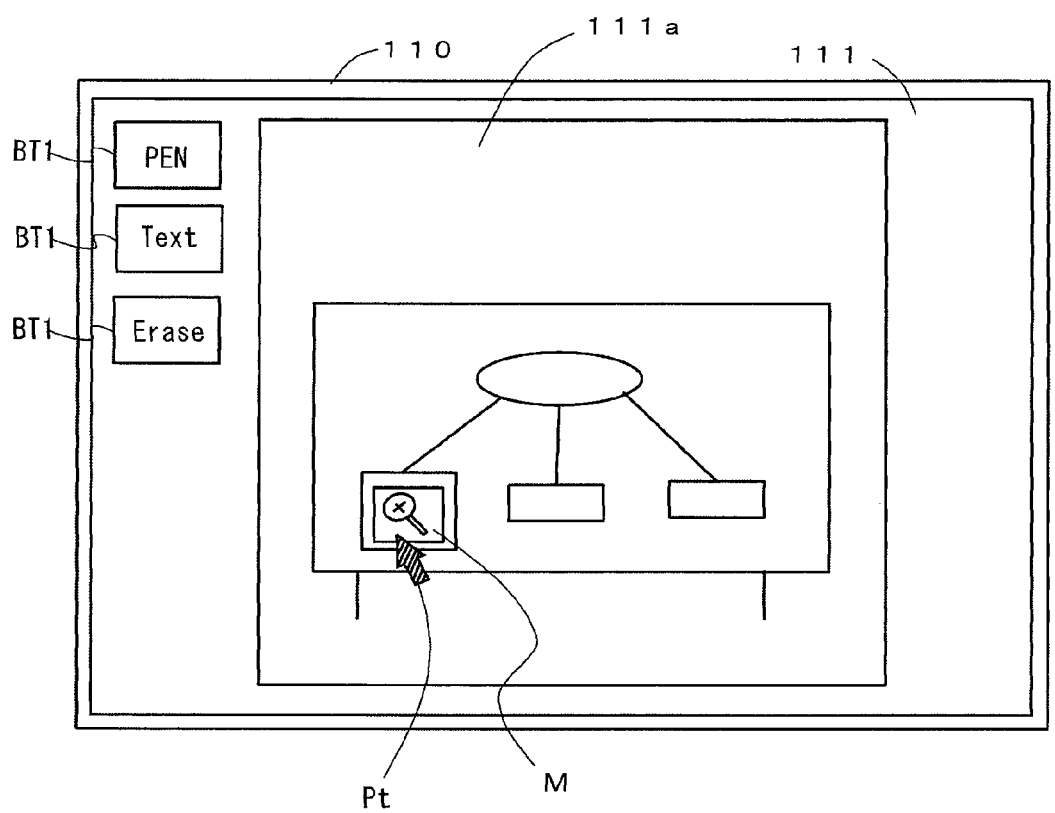
FIG. 9 shows an example of a display screen.

Referring now to FIGS. 7 through 9, a drawing instructing operation with respect to a captured zoomed image to be performed in the server 50 is described. The drawing instructing operation is characteristic of the present invention.

FIG. 7 is a flowchart showing an example of an operation to store an annotation image AN for the captured zoomed image 112a. FIG. 8 shows an example of the zoom display screen 112. FIG. 9 shows an example of the display screen 111. The flowchart of FIG. 7 may be included in the flowchart of FIG. 4 showing an example of an operation to be performed by the server 50, and more preferably, may be included in step S15 of FIG. 7. The same applies to the other operations described later.

First, the server 50 determines whether a drawing instruction is issued for the captured zoomed image 112a (step S31). This determining procedure is carried out by determining whether there is a drawing instruction to project an annotation image onto the captured zoomed image 112a, as shown in FIG. 8.

If there is such a drawing instruction, the server 50 associates the image capturing conditions of the video camera 22 with the drawing instruction, and stores the image capturing conditions and the drawing instruction (step S32). The image capturing conditions specify magnification ratio, reduction ratio, the location information about the zoomed-in area AR1, the size and shape of the zoomed-in area AR1, and the likes.

The server 50 then calculates the coordinates of the annotation image AN in the captured image 111a (step S33). More specifically, the server 50 stores the designated position of the annotation image AN in the captured zoomed image 112a into a memory device or the like. Based on the designated position and the displayed position of the zoomed-in area AR1, the server 50 calculates the position of the annotation image AN in the captured image 111a, while maintaining the correspondence relationship.

The server 50 then transmits a marker command to the computer 120. The marker command is executed by the computer 120 to display a marker M in the captured image 111a. If the instruction with respect to the annotation image AN is issued for the captured zoomed image 112a, the marker M indicates that there is an annotation at the corresponding location on the captured zoomed image 112a. The marker M is not necessarily a figure, but may be a character. Accordingly, when the marker M is displayed on the captured image 111a, the operator of the terminal 100 can recognize that the annotation image AN is put on the captured zoomed image 112a through the display screen 111, as shown in FIG. 9.

Second Exemplary Embodiment

Next, a second exemplary embodiment is described.

Figure 10:
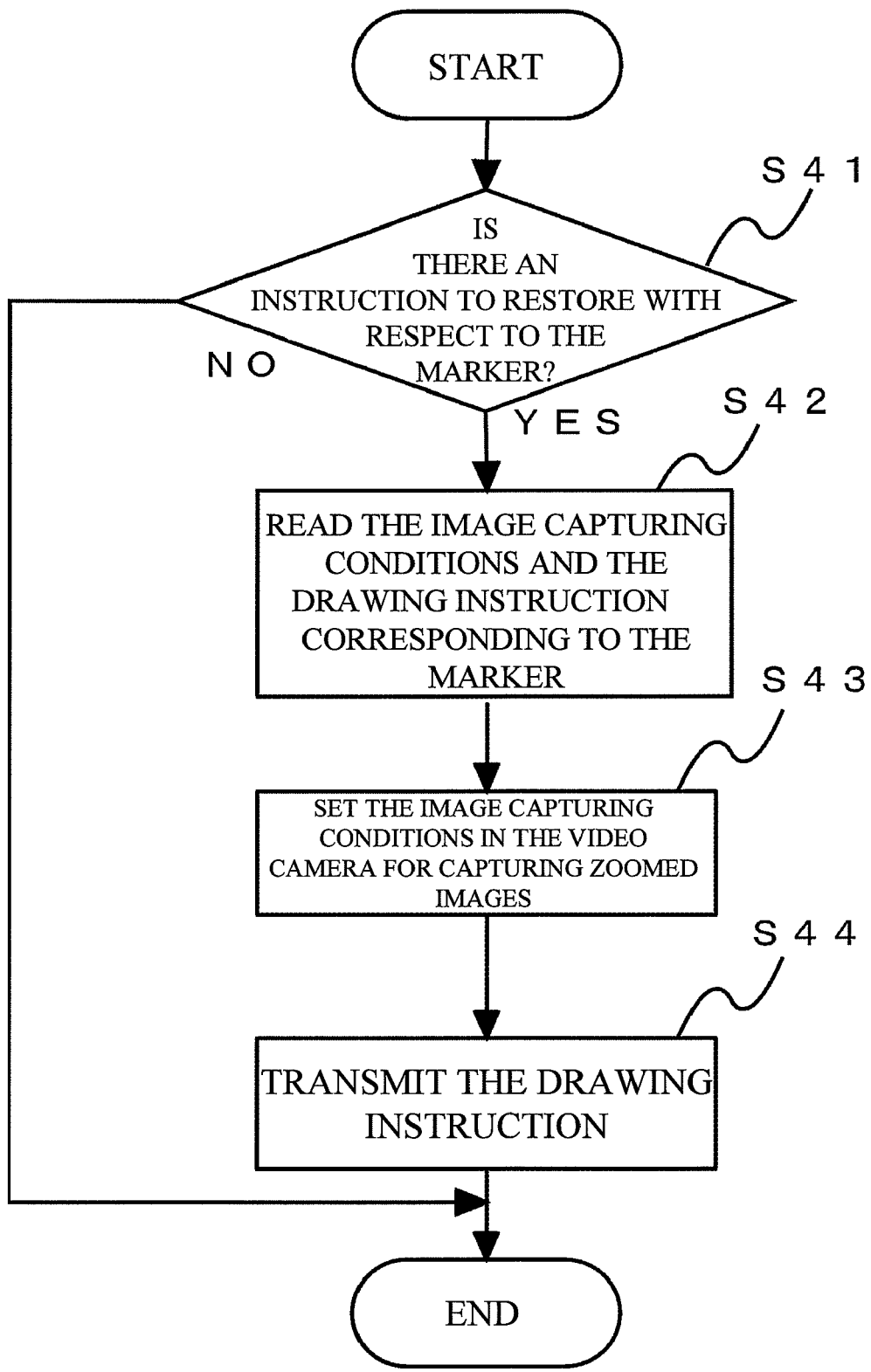
FIG. 10 is a flowchart showing an example of an operation to restore an annotation image.

FIG. 10 is a flowchart showing an example of an operation to restore the annotation image AN.

As shown in FIG. 10, the server 50 first determines whether there is an instruction with respect to the marker M (step S41). The determining procedure may be carried out by determining whether the pointer Pt is placed on the marker M, and the marker M is double-clicked to issue a restoring instruction by the operator of the terminal 100 handling the pointing device 130, as shown in FIG. 9. If a restoring instruction is not issued by the operator, the server 50 ends the operation without performing the following procedures.

If there is a restoring instruction, the server 50 reads the image capturing conditions and the drawing instruction associated with the marker M (step S42). The image capturing conditions are the image capturing conditions of the video camera 22 stored in the memory device such as a RAM or a ROM in the procedure of step S32.

Based on the read image capturing conditions, the server 50 sets the image capturing conditions of the video camera 22 (step S43). Accordingly, the video camera 22 is set in accordance with the stored image capturing conditions, and the server 50 transmits the captured zoomed image 112a to the computer 120. The server 50 then transmits the stored drawing instruction (step S44).

As described above, in this exemplary embodiment, when a restoring instruction is issued for the marker M displayed in the captured image 111a on the display screen 111, the server 50 sets the image capturing conditions associated with the marker M in the video camera 22, and transmits the captured zoomed image 112a to the computer 120.

Upon receipt of the captured zoomed image 112a, the computer 120 causes the display device 110 to display the zoom display screen 112 in the display screen 111, and display the captured zoomed image 112a on the zoom display screen 112. Upon receipt of the drawing instruction corresponding to the marker M, the computer 120 displays the annotation image AN according to the drawing instruction in the captured zoomed image 112a. As a result, the annotation image AN displayed in the captured zoomed image 112a is restored while the conformity with the captured zoomed image 112a is established, as shown in FIG. 8.

Third Exemplary Embodiment

Figure 11:
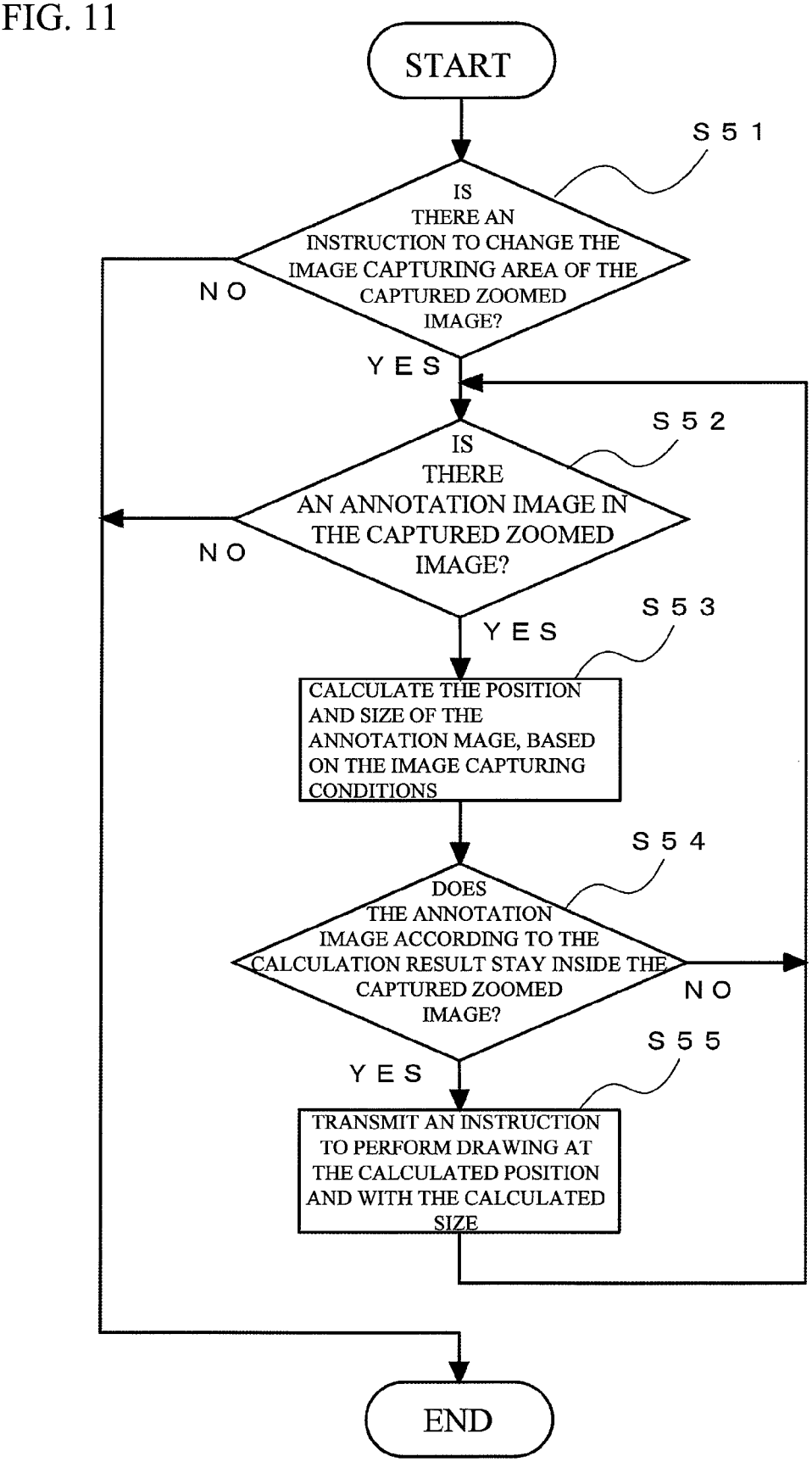
FIG. 11 is a flowchart showing an example of an operation to be performed by the server to change the zoomed-in area.
Figure 12:
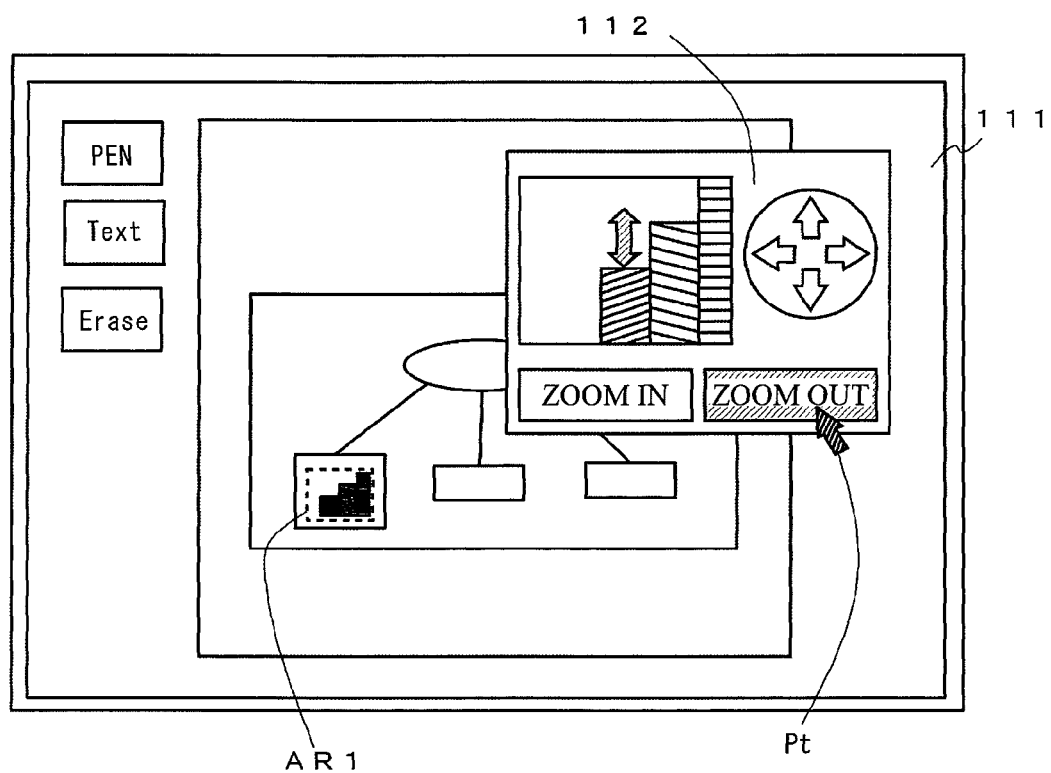
FIG. 12 shows an example of the display screen prior to the changing operation.
Figure 13:
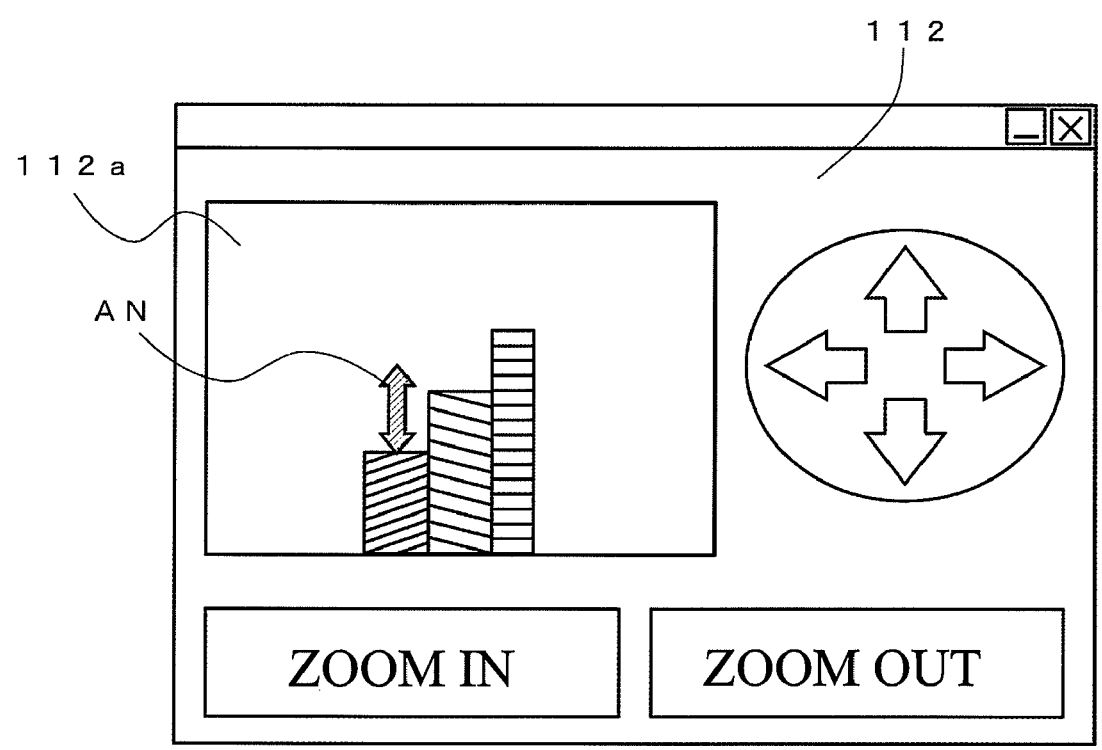
FIG. 13 shows an example of the zoom display screen after the changing operation.

Referring now to FIGS. 11 through 13, a third exemplary embodiment of the present invention is described.

FIG. 11 is a flowchart showing an example of a zoomed-in area changing operation to be performed by the server 50. FIG. 12 is an example of the display screen 111 prior to the changing operation. FIG. 13 is an example of the zoom display screen 112 after the changing operation.

In an indicator system in accordance with this exemplary embodiment, the captured zoomed image 112a and the annotation image AN in the captured zoomed image 112a are changed through a zoomed-in area changing operation such as a zooming-out operation performed on the zoom display screen 112.

As shown in FIG. 11, the server 50 first determines whether there is an instruction to change the zoomed-in area AR1 of the captured zoomed image 112a (step S51). This determining procedure may be carried out by determining whether the pointer Pt is placed on the zoom-out button BT2 for reducing the magnification ratio, and the zoom-out button BT2 is clicked to issue an instruction by the operator of the terminal 100 handling the pointing device 130, as shown in FIG. 12.

A changing instruction is issued not only by clicking the zoom-out button BT2, but also by clicking the zoom-in button BT2 for increasing the magnification ratio, or clicking the cursor buttons BT3 to move the zoomed-in area AR1 vertically and horizontally.

If there is an instruction to change the zoomed-in area AR1, the server 50 determines whether the annotation image AN is displayed in the captured zoomed image 112a (step S52). For example, since the annotation image AN is displayed in the captured zoomed image 112a shown in FIG. 12, the server 50 determines that the annotation image AN is displayed.

The server 50 then calculates the display position, size, and shape of the annotation image AN, based on the image capturing conditions (step S53). In accordance with the image capturing conditions of the video camera 22 changed by the zooming-out or the like, the server 50 calculates the new display position, new size, and the likes of the annotation image AN in the captured zoomed image 112a.

The server 50 then determines whether the annotation image AN obtained as a result of the calculation stays inside the captured zoomed image 112a (step S54). For example, in a case where a new annotation image AN cannot stay inside the captured zoomed image 112a as the zoomed-in image AR1 of the video camera 22 is magnified in accordance with a changing instruction issued through the zoom-in button BT2, or in a case where a new annotation image AN steps out of the captured zoomed image 112a as the image capturing area AR1 of the video camera is moved in accordance with a changing instruction issued through the cursor buttons BT3, the server 50 determines that the annotation image AN obtained as a result of the calculation does not stay inside the captured zoomed image 112a, and returns to the procedure of step S52. At this point, in accordance with an erasing instruction or the like, the server 50 may erase the annotation image AN obtained as a result of the calculation.

If the annotation image AN obtained as a result of the calculation stays inside the captured zoomed image 112a, the server 50 transmits a drawing instruction to display the annotation image AN according to the calculated display position, the calculated size, and the likes to the computer 120 (step S55).

As a result, the captured zoomed image 112a having the reduced magnification ratio is displayed in the zoom display screen 112, and the annotation image AN having the reduced magnification ratio is displayed in the captured zoomed image 112a while the conformity with the display position is maintained, as shown in FIG. 13. As described above, in accordance with this exemplary embodiment, when there is a change in the zoomed-in area AR1, the annotation image AN to be displayed in the captured zoomed image 112a is also changed in conformity with the change of the zoomed-in area AR1.

Fourth Exemplary Embodiment

Referring now to FIGS. 14 through 19, a fourth exemplary embodiment of the present invention is described.

Figure 14:
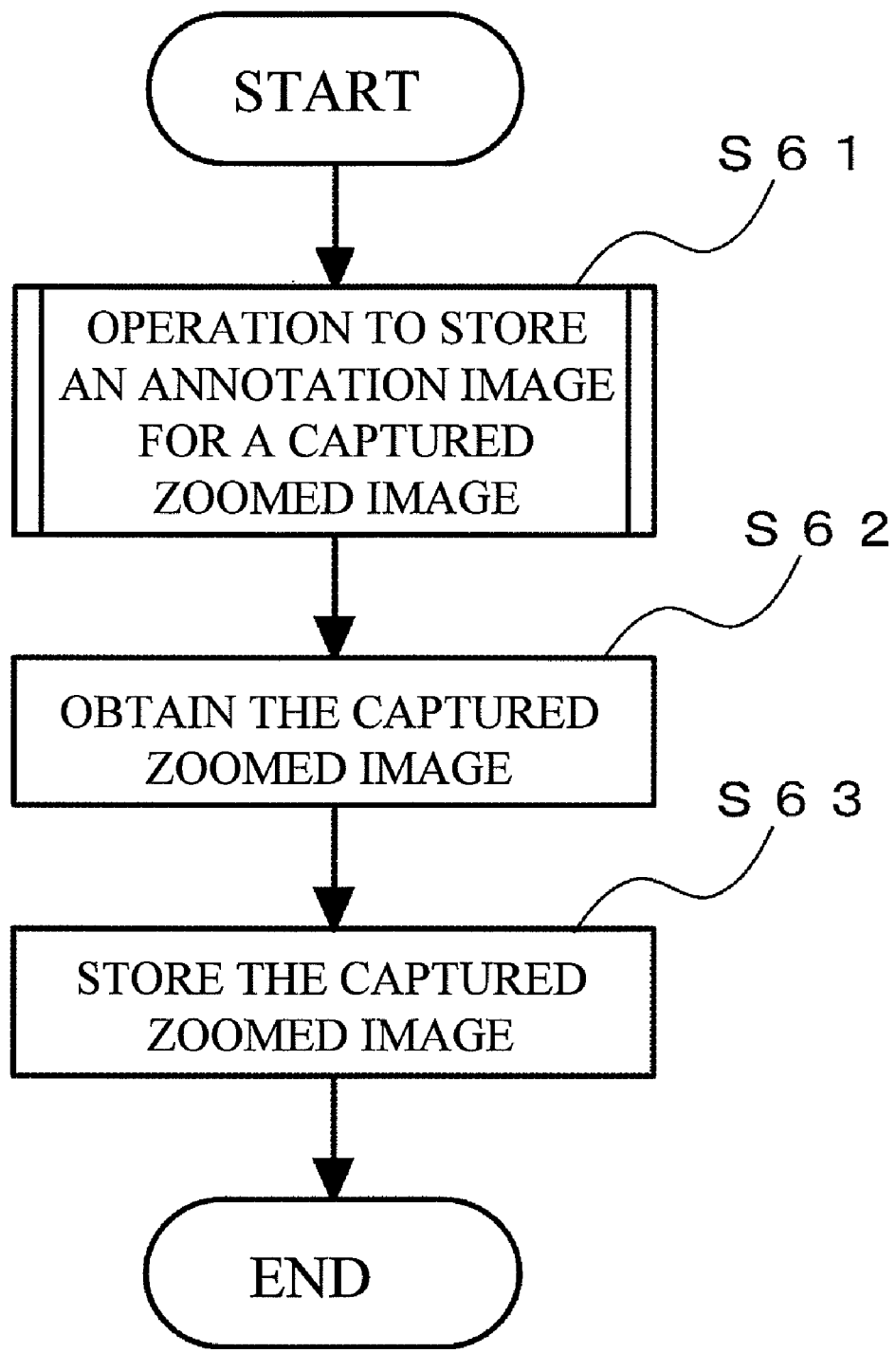
FIG. 14 is a flowchart showing an example of an operation to be performed by the server to store a captured zoomed image.
Figure 15:
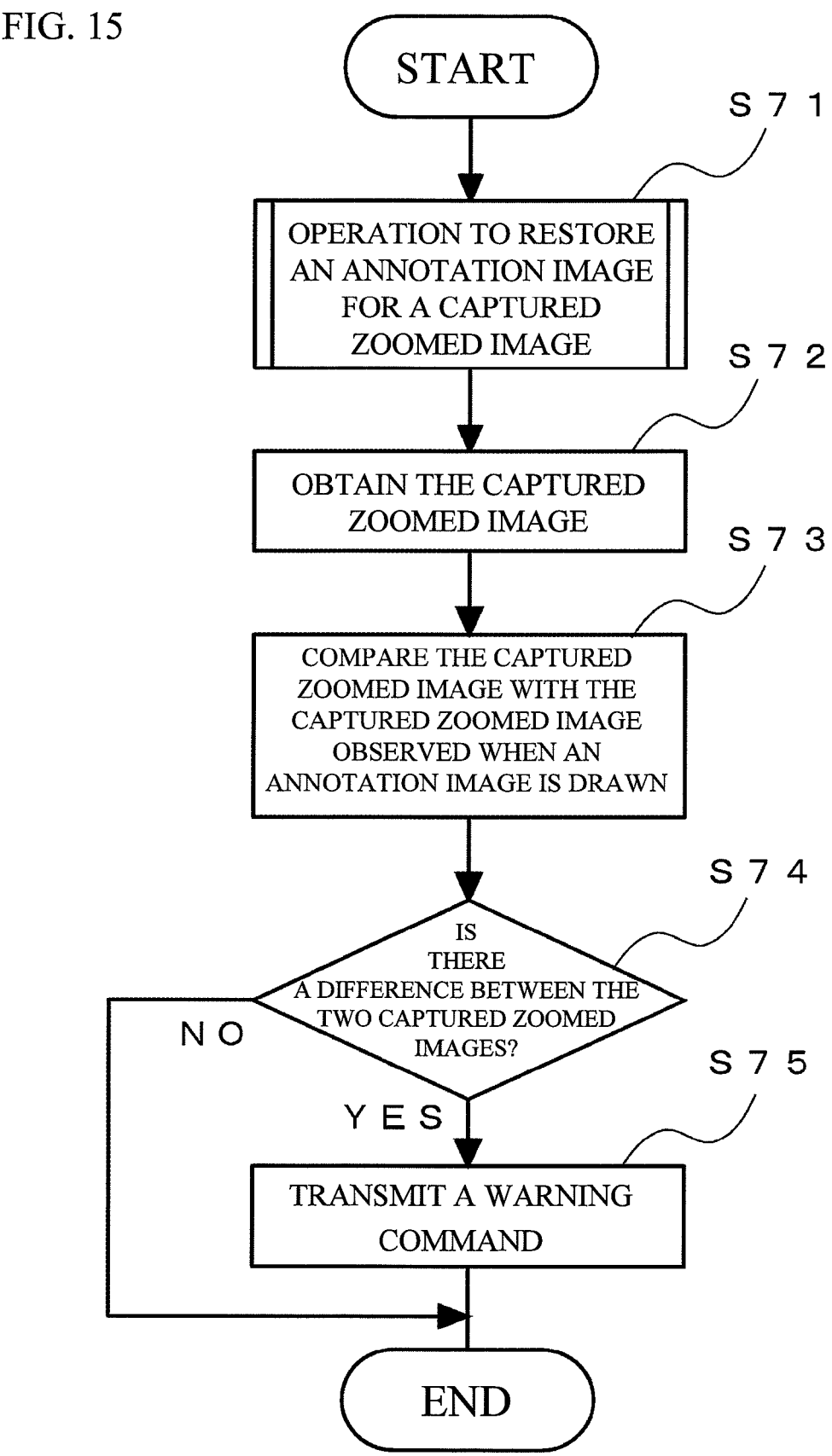
FIG. 15 is a flowchart showing an example of an operation to be performed by the server to display a warning.
Figure 16:
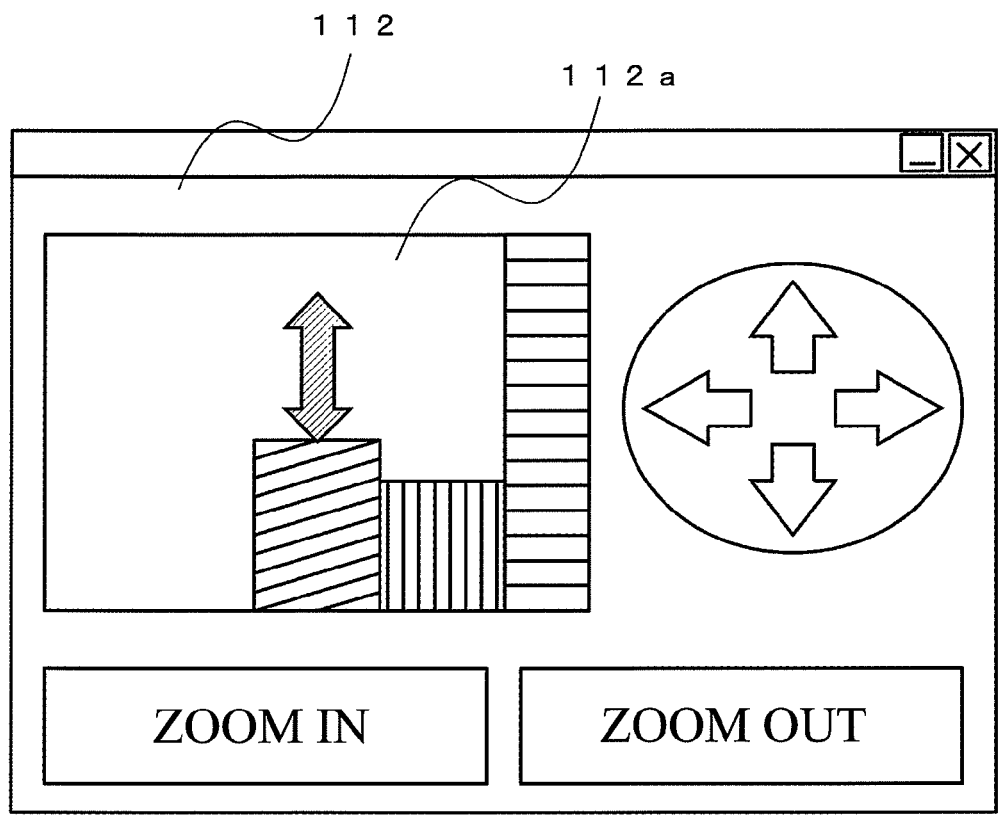
FIG. 16 is an example of the zoom display screen.
Figure 17:
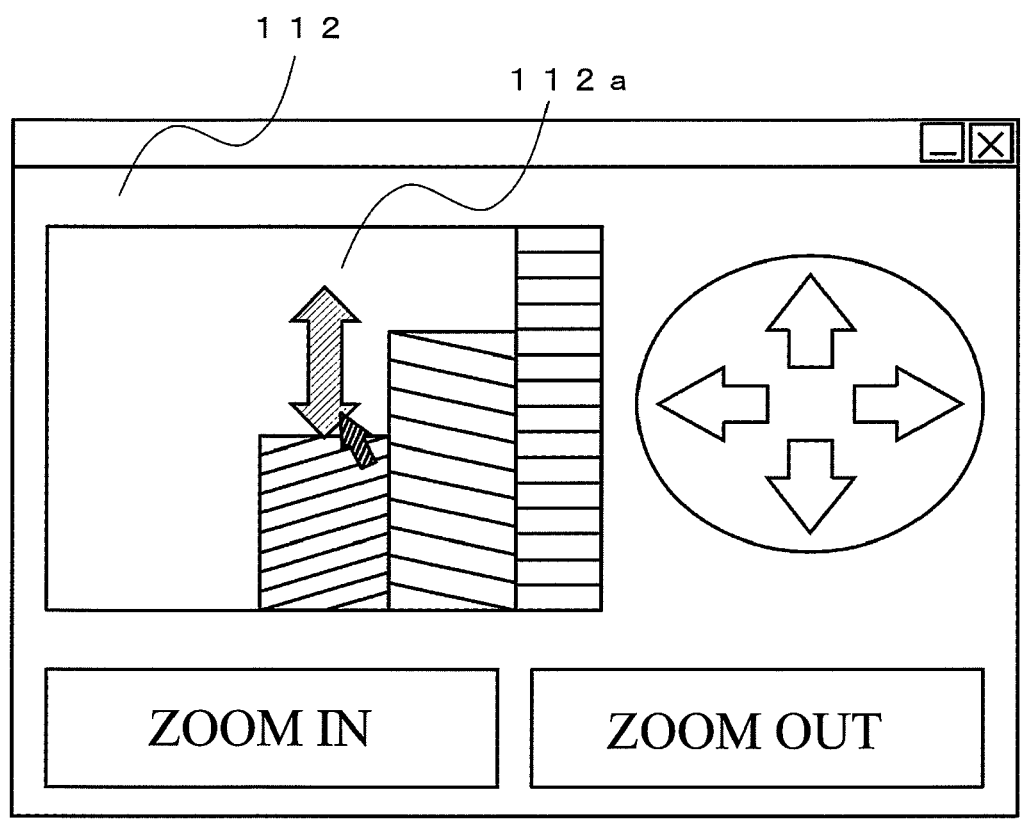
FIG. 17 is another example of the zoom display screen.
Figure 19:
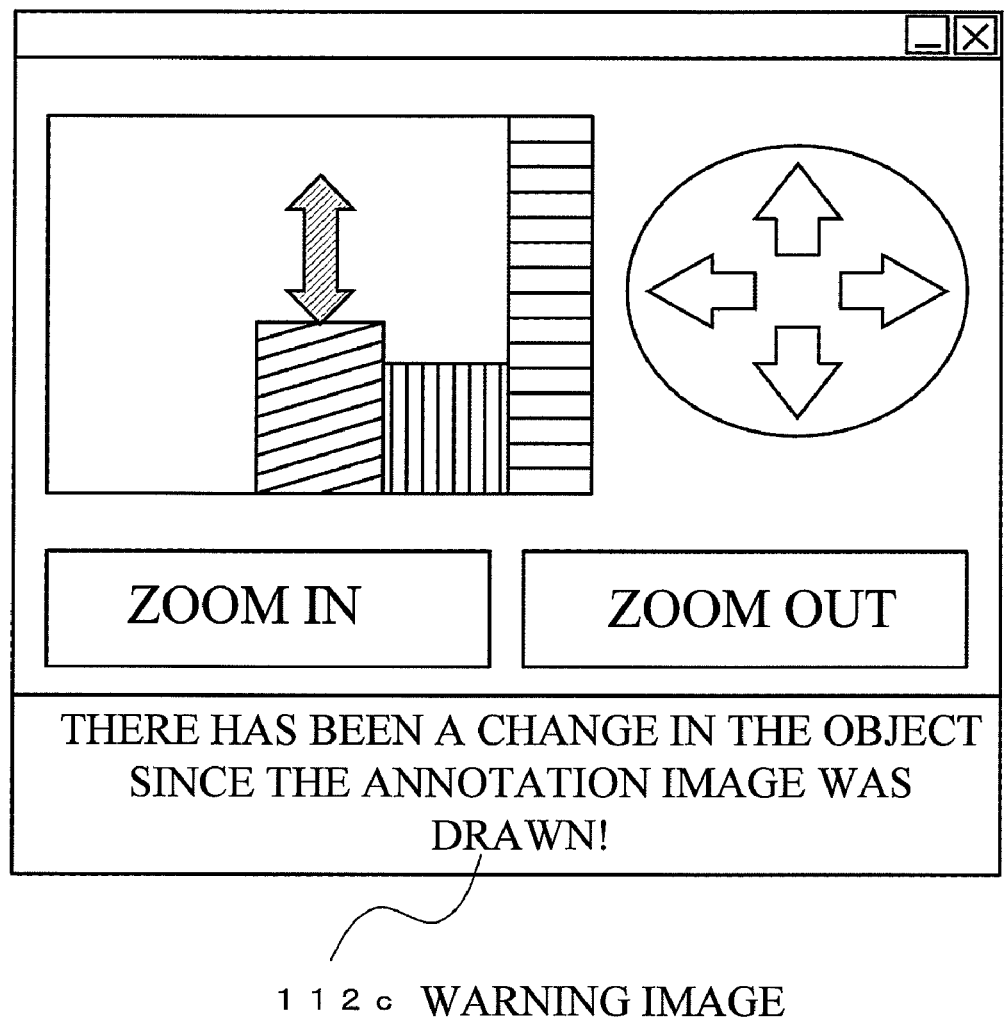
FIG. 19 is a schematic view for explaining a warning display.

FIG. 14 is a flowchart showing an example of a captured zoomed image storing operation to be performed by the server 50. FIG. 15 is a flowchart showing an example of a warning display operation to be performed by the server 50. FIGS. 16 and 17 each show an example of the zoom display screen 112. FIG. 17 is a schematic view for explaining a difference image. FIG. 19 is a schematic view for explaining a warning display.

In this exemplary embodiment, a drawing instruction for the captured zoomed image 112a is issued, and an annotation image AN is displayed. After that, the zoom display screen 112 ends the display of the annotation image AN. If there is a difference between the captured zoomed image 112a displayed on the zoom display screen 112 and the previous captured zoomed image 112a when the zoom display screen 112 is again displayed, a warning that there is a change in the captured zoomed image 112a serving as the base of the annotation image AN is displayed.

First, an operation to store the annotation image AN for the captured zoomed image 112a is described.

As shown in FIG. 14, the server 50 first performs an operation to store an annotation image for a captured zoomed image (step S61). The operation to store an annotation image for a captured zoomed image is equivalent to the operation to store an annotation image AN described with reference to FIG. 7.

After ending the procedure of step S61, the server 50 obtains a captured zoomed image 112a (step S62), and stores the captured zoomed image 112a (step S63). For example, if the captured zoomed image 112a shown in FIG. 16 is displayed on the zoom display screen 112, the server 50 obtains and stores this captured zoomed image 112a.

Next, a case where the zoom display screen 112 is again displayed through restoration is described.

As shown in FIG. 15, the server 50 first performs an operation to restore an annotation image for a captured zoomed image (step S71). This operation to restore an annotation image for a captured zoomed image is equivalent to the operation to restore an annotation image AN described with reference to FIG. 10. Through this operation, the server 50 obtains a captured zoomed image 112a having an annotation image AN displayed therein, as shown in FIG. 16.

The server 50 then obtains another captured zoomed image 112a (step S72). More specifically, the server 50 obtains a captured zoomed image 112a captured by the video camera 22, after the captured zoomed image 112a having the annotation image AN displayed therein is restored. For example, the server 50 obtains the captured zoomed image 112a shown in FIG. 17.

The server 50 then compares the captured zoomed image 112a obtained in step S71 with the captured zoomed image 112a obtained in step S72 (step S73). Here, the server 50 compares the captured zoomed image 112a shown in FIG. 16 with the captured zoomed image 112a shown in FIG. 17.

Figure 18:
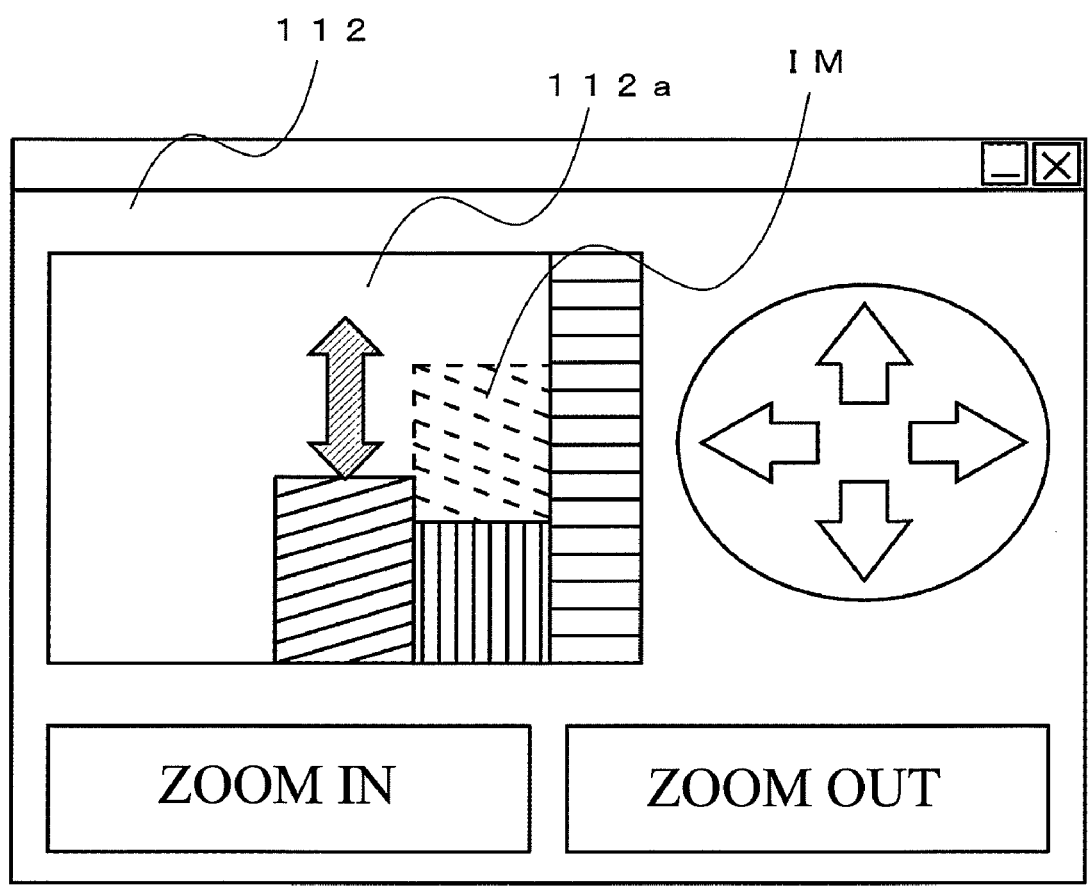
FIG. 18 is a schematic view for explaining a difference image.

Based on the result of the comparison, the server 50 determines whether there is a difference between the two captured zoomed images 112a (step S74). For example, when the two captured zoomed images 112a are superimposed on each other, a difference image IM exists in the image of the rectangle interposed between the images of the other two rectangles in the captured zoomed images 112a, as shown in FIG. 18. In this case, the server 50 determines that there is a difference between the two captured zoomed images 112a. Alternatively, the server 50 may determine that there is a difference, only if the difference is a large difference. In such a case, the server 50 determines that the difference is a large difference, when the difference is larger than a predetermined threshold value. The threshold value may be a characteristic value such as the value of brightness or the value of the edge.

If the server 50 determines that there is a difference between the two captured zoomed images 112a in step S74, the server 50 transmits a warning display command (step S75). Upon receipt of the warning display command, the computer 120 causes the display device 110 to display a warning display screen 112c together with the zoom display screen 112, as shown in FIG. 19. The display position of the warning display screen 112c is not limited to the position below the zoom display screen 111, but may be anywhere on the display device 110. The warning display screen 112c may be even superimposed on the zoom display screen 112.

As described above, in accordance with this exemplary embodiment, the operator of the terminal 100 can visually recognize the difference between a captured zoomed image 112a having an annotation image AN drawn therein and a captured zoomed image 112a obtained when an annotation image AN is restored.

Although the exemplary embodiments of the present invention have been described so far, the present invention is not limited to those specific examples, and various changes and modifications may be made to them within the scope of the present invention. For example, the program according to the present invention can be provided through communications, but it may also be stored in a recording medium such as a CD-ROM to be provided.

In the above described embodiments, the video camera 21 and the video camera 22 are both used. However, in a case where the video camera 21 has a digital zoom function, only the video camera 21 may be used. In this manner, the number of components in the indicator system can be reduced. The video camera 21 may further have a panning function and a tilting function.

Each "magnification ratio" in the above embodiments is not necessarily higher than 100%, but may be lower than 100%, which is a reduction.

In accordance with the present invention, a captured zoomed image and an annotation image can be reproduced based on the image capturing conditions observed when the annotation image is attached. In this manner, it is possible to have smooth communications with remote places. Thus, the present invention has high industrial applicability.

What is claimed is:

1. An indicator system comprising:
a controller that transmits an image captured by an image capturing unit and a zoomed image captured by a zoom image capturing unit to a terminal, the image capturing unit capturing an image of an object, the zoom image capturing unit zooming in the object and capturing an image of the zoomed-in object, the controller causing a projecting unit to project an annotation image onto the object, the annotation image indicating an annotation in accordance with an instruction based on the image and given in the terminal; and
a storing unit that stores conditions for capturing the zoomed image and the instruction which is associated with the conditions, when the instruction with respect to the annotation image is issued for the zoomed image,
wherein, when the instruction with respect to the annotation image is issued for the zoomed image, the controller has a marker displayed on a corresponding spot on the captured image, the marker indicating that the annotation image is provided.

2. The indicator system as claimed in claim 1, wherein, when the marker is displayed, the controller restores and displays the zoomed image and the annotation image, based on the image capturing conditions, while the zoomed image and the annotation image maintain consistency with each other.

3. The indicator system as claimed in claim 1, wherein:
when an instruction with respect to the annotation image is issued for a captured zoomed image formed by zooming in part of the captured image, the controller stores the captured zoomed image together with image capturing conditions thereof,
when the marker is displayed, the controller stores a captured zoomed image that satisfies the image capturing conditions at the display position of the marker; and
when there is a difference between the two captured zoomed images compared with each other, the controller causes the indicator system to display a warning for a different effect from the zoomed image displayed when the instruction with respect to the annotation image is issued.

4. An indicator system comprising:
a controller that transmits an image captured by an image capturing unit and a zoomed image captured by a zoom image capturing unit to a terminal, the image capturing unit capturing an image of an object, the zoom image capturing unit zooming in the object and capturing an image of the zoomed-in object, the controller causing a projecting unit to project an annotation image onto the object, the annotation image indicating an annotation in accordance with an instruction based on the image and given in the terminal; and
a storing unit that stores conditions for capturing the zoomed image and the instruction which is associated with the conditions, when the instruction with respect to the annotation image is issued for the zoomed image,
wherein, when an instruction to change an image capturing region of the zoomed image having the annotation image displayed therein is issued, the controller has a portion of the zoomed image and the annotation image corresponding to the image capturing region displayed in the image capturing region.

5. The indicator system as claimed in claim 4, wherein, when the annotation image is displayed, the controller has the annotation image displayed while display positions of annotation images before and after a change are maintained in alignment with each other.

6. A non-transitory computer readable medium storing a program causing a computer to execute a process for performing an indicating operation, the process comprising:
transmitting an image captured by an image capturing unit and a zoomed image captured by a zoom image capturing unit to a terminal, the image capturing unit capturing an image of an object, the zoom image capturing unit zooming in the object and capturing an image of the zoomed-in object;
causing a projecting unit to project an annotation image onto the object, the annotation image indicating an annotation in accordance with an instruction based on the image and given in the terminal; and
storing conditions for capturing the zoomed image and the instruction which is associated with the conditions, when the instruction with respect to the annotation image is issued for the zoomed image,
wherein, when the instruction with respect to the annotation image is issued for the zoomed image, a marker is displayed on a corresponding spot on the captured image, the marker indicating that the annotation image is provided.

7. A non-transitory computer readable medium storing a program causing a computer to execute a process for performing an indicating operation, the process comprising:

transmitting an image captured by an image capturing unit and a zoomed image captured by a zoom image capturing unit to a terminal, the image capturing unit capturing an image of an object, the zoom image capturing unit zooming in the object and capturing an image of the zoomed-in object;

causing a projecting unit to project an annotation image onto the object, the annotation image indicating an annotation in accordance with an instruction based on the image and given in the terminal; and storing conditions for capturing the zoomed image and the instruction which is associated with the conditions, when the instruction with respect to the annotation image is issued for the zoomed image, wherein, when an instruction to change an image capturing region of the zoomed image having the annotation image displayed therein is issued, a portion of the zoomed image and the annotation image corresponding to the image capturing region is displayed in the image capturing region.

8. An indicating device comprising:

a projecting unit that projects an annotation image onto an object;

an image capturing unit that captures an image of the object;

a zoom image capturing unit that captures a zoomed image of the object and the projected annotation;

a controller that transmits the image captured by the image capturing unit and the zoomed image captured by the zoom image capturing unit to a terminal, the image capturing unit capturing an image of an object, the zoom image capturing unit zooming in the object and capturing an image of the zoomed-in object, the controller causing a projecting unit to project an annotation image onto the object, the annotation image indicating an annotation in accordance with an instruction based on the image and given in the terminal; and a storing unit that stores conditions for capturing the zoomed image and the instruction which is associated with the conditions, when the instruction with respect to the annotation image is issued for the zoomed image, wherein, when the instruction with respect to the annotation image is issued for the zoomed image, the controller has a marker displayed on a corresponding spot on the captured image, the marker indicating that the annotation image is provided.

9. An indicating device comprising:

a projecting unit that projects an annotation image onto an object;

an image capturing unit that captures an image of the object;

a zoom image capturing unit that captures a zoomed image of the object and the projected annotation;

a controller that transmits the image captured by the image capturing unit and the zoomed image captured by the zoom image capturing unit to a terminal, the image capturing unit capturing an image of an object, the zoom image capturing unit zooming in the object and capturing an image of the zoomed-in object, the controller causing a projecting unit to project an annotation image onto the object, the annotation image indicating an annotation in accordance with an instruction based on the image and given in the terminal; and a storing unit that stores conditions for capturing the zoomed image and the instruction which is associated with the conditions, when the instruction with respect to the annotation image is issued for the zoomed image, wherein, when an instruction to change an image capturing region of the zoomed image having the annotation image displayed therein is issued, the controller has a portion of the zoomed image and the annotation image corresponding to the image capturing region displayed in the image capturing region.

* * * * *